United States Patent [19]

Gillespie

[11] Patent Number: 4,505,067

[45] Date of Patent: Mar. 19, 1985

[54] APPARATUS FOR HYDRAULIC TREE INJECTION

[76] Inventor: John L. Gillespie, R.D. #1, Box 223-1, Scottdale, Pa. 15683

[21] Appl. No.: 496,852

[22] Filed: May 23, 1983

[51] Int. Cl.³ .............................................. A01G 29/00
[52] U.S. Cl. ..................................................... 47/57.5
[58] Field of Search ...................... 47/57.5, 48.5, 810; 417/521, 234; 222/275–277; 137/567

[56] References Cited

U.S. PATENT DOCUMENTS

| | | | |
|---|---|---|---|
| 1,629,302 | 5/1927 | Pfister | 47/57.5 X |
| 2,044,063 | 6/1936 | Dahlberg | 47/57.5 |
| 2,309,391 | 1/1943 | Hecht | 47/57.5 |
| 3,832,803 | 9/1974 | Blake et al. | 47/57.5 |
| 3,834,075 | 9/1974 | Nix et al. | 47/57.5 |
| 3,992,813 | 11/1976 | Freshel | 47/57.5 |
| 4,011,685 | 3/1977 | Boyd et al. | 47/57.5 |
| 4,090,328 | 5/1978 | Enos | 47/57.5 X |
| 4,112,617 | 9/1978 | Purviance | 47/57.5 |
| 4,144,673 | 3/1979 | Quast et al. | 47/57.5 |
| 4,176,495 | 12/1979 | Dale | 47/57.5 |

FOREIGN PATENT DOCUMENTS 677364  8/1952  United Kingdom ................. 47/57.5

OTHER PUBLICATIONS

G. K. Brown, "Prototype Equipment for Commercial Pressure-Injection of Aqueous Growth Regulators into Trees", *Journal of Arboriculture*, pp. 7–13, Jan. 1978.

*Primary Examiner*—James R. Feyrer
*Assistant Examiner*—Danton DeMille
*Attorney, Agent, or Firm*—Webb, Burden, Robinson & Webb

[57] ABSTRACT

A portable hydraulic injection unit having a housing containing a liquid reservoir and a plurality of vertical cylinders. A manifold is in fluid communication with the reservoir and individual inlet hoses connect the manifold with each cylinder. A check valve is located between the manifold and each cylinder to prevent back flow from the cylinders into the manifold. A piston is located within each cylinder and a piston rod is attached to each piston and extends upwardly out of the cylinder and is connected to an operating arm for raising and lowering the piston rods and pistons relative to the cylinders. An outlet is located at the lower end of each cylinder and an outlet hose is connected to the outlet to transmit liquid from each cylinder to an injector at the end of each outlet hose. A check valve is located between each cylinder and its outlet hose. A wheeled dolly supports the hydraulic injection unit.

19 Claims, 7 Drawing Figures

APPARATUS FOR HYDRAULIC TREE INJECTION

BACKGROUND OF THE INVENTION

1. Field of the Invention

The invention relates generally to apparatus for injecting a chemical solution into a plurality of holes which have been drilled into the trunk of a tree. More particularly, the invention relates to a portable hydraulic injection unit which may be mounted on a wheeled dolly for easy transportion. The injection unit includes a nonpressurized reservoir carrying the liquid to be injected into the trees and a plurality of individual cylinders for supplying individual hoses which are connected to the individual cylinders. Each hose has an injector at its free end which is inserted into a hole in the trunk of the tree which is to be treated.

2. Description of the Prior Art

It is often desirable to inject a tree with appropriate liquid chemical solutions to supply nutrients to the tree or to treat the tree for fungus or for pests. Recently, trees have also been treated with a liquid chemical solution to inhibit the growth of the tree so that the frequency of pruning is decreased. It is presently necessary to prune excess growth from trees approximately every three years or the new growth interferes with power lines. When a growth inhibitor is injected into a tree immediately after pruning, the growth of the tree is inhibited to an extent that it is not necessary to prune the tree for one or more additional years. Such results in a considerable savings to power companies owning power lines passing through the trees treated with a growth inhibitor.

Examples of apparatus for injecting a liquid into trees will be found in U.S. Pat. Nos. 4,176,495; 4,112,617; 4,011,685 and 3,992,813. The apparatus disclosed in the first mentioned patent is a combined drilling and injecting apparatus and is mounted on a mobile unit having a hydraulically operated boom. This type of apparatus is impractical for many applications since the trees to be treated must be located adjacent to a roadway or in an area which is accessible to a vehicle. The apparatus disclosed in U.S. Pat. No. 3,992,813 is pressurized and requires a plurality of tanks which are not easy to manually transport to the site of the trees to be treated. U.S. Pat. Nos. 4,112,617 and 4,011,685 are directed to hand held needle injectors which permit injection of one hole at a time and have a relatively small capacity. Additionally, the devices disclosed in all of the above patents with the exception of U.S. Pat. No. 4,011,685 require a source of pressurized gas to force the liquid into the trunk of the tree being treated, and such is impractical as it requires manually transporting a pressurized gas tank to the site of the trees to be treated.

SUMMARY OF THE INVENTION

The invention is a portable apparatus for hydraulic tree injection which includes a liquid reservoir and a plurality of individual cylinders. The inlet of each cylinder is in flow communication with the reservoir through a manifold, a hose and a one-way check valve, and the outlet of each cylinder is attached to a hose having an injection nozzle at its end and a one-way check valve is located at the inlet end of each hose. A reciprocating piston is located in each cylinder, and the rod for each piston is attached to an operating arm so that the piston may be raised in its cylinder to draw liquid into the cylinder from the reservoir through a check valve and lowered in its cylinder to force liquid out of the cylinder through a check valve into the hose connected to the check valve to an injector.

BRIEF DESCRIPTION OF THE DRAWINGS

Preferred embodiments of the invention are described hereinafter with reference to the accompanying drawings in which.

DESCRIPTION OF THE PREFERRED EMBODIMENTS

Figure 1:
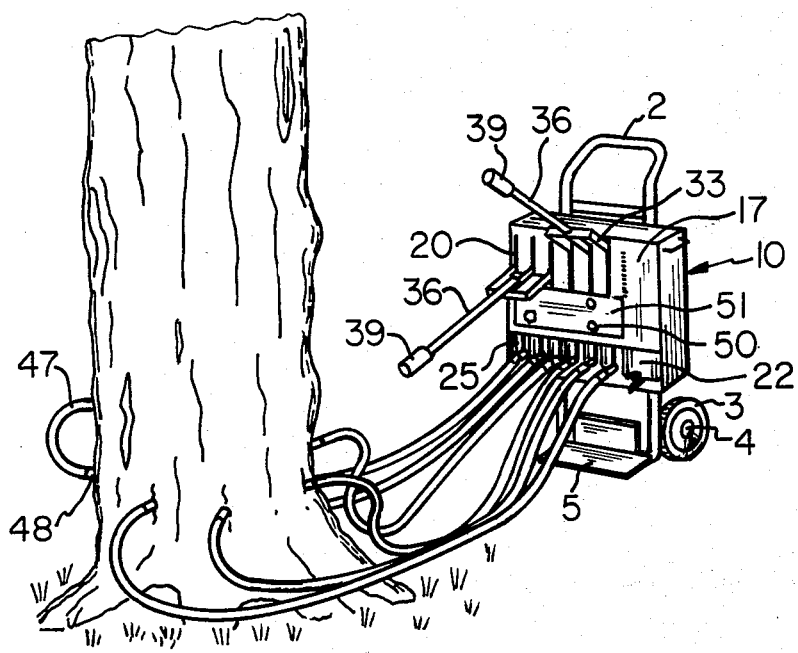
FIG. 1 is a perspective view of the injection apparatus with the injectors inserted into a tree trunk.

In the following description, like reference numerals are used to describe like parts in the different embodiments.

Figure 2:
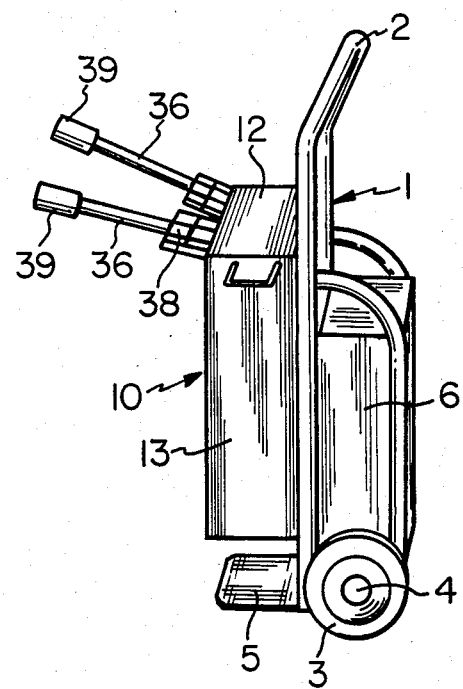
FIG. 2 is a side view of the apparatus shown in FIG. 1 with the hoses removed.
Figure 3:
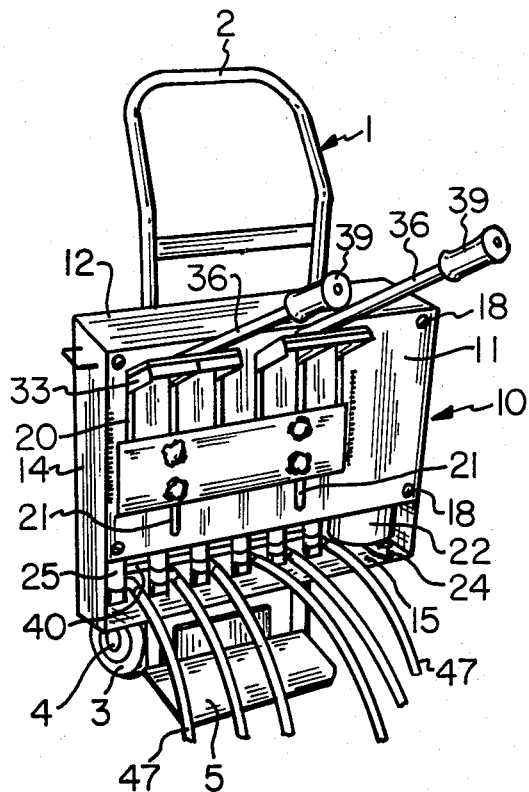
FIG. 3 is another perspective view of the apparatus shown in FIG. 1.

With reference to FIGS. 1-3 of the drawings, it will be seen that the invention includes a standard light weight dolly 1 having a frame with a handle portion 2 and a pair of wheels 3 mounted on an axle 4 which is carried at the lower end of the frame. The dolly has a base plate 5 which is normally used for carrying a load. The dolly is a standard commercial item and its construction forms no part of the invention. A metal storage box 6 is welded or bolted to the rear of the frame of the dolly.

A hydraulic injection unit 10 having a metal housing 11 is attached to the dolly by welding or by a mechanical connection such as bolting. The housing is attached to the frame of the dolly above the wheels 3 and the base 5 and below the handle portion 2. While the injection unit is shown as mounted on a wheeled dolly, it will be understood by those skilled in the art that the dolly is not critical as the injection unit may be picked up and carried from tree by the operator. The housing has a top wall 12, spaced sidewalls 13 and 14, a bottom wall 15 and a rear wall 16. Additionally, the housing has a removable front wall 17 which is attached to the forward edges of sidewalls 13 and 14 by a plurality of sheet metal screws 18. The front wall 17 is formed with a plurality of substantially vertical parallel slots 20 and 21. The slots 21 extend downwardly below the lower end of slots 20 for a purpose to be described hereinafter. The slots may be considered as being arranged in two sets of three slots each with a slot 21 being the center slot in each set.

Figure 4:
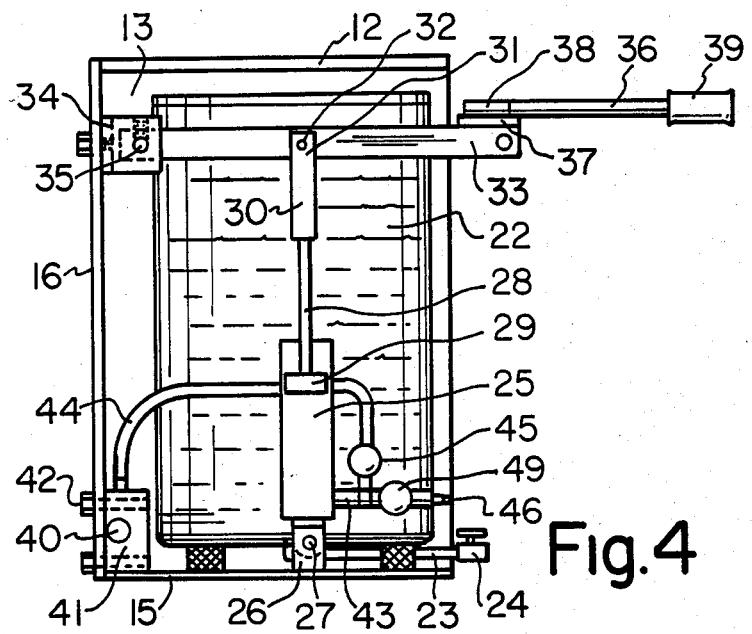
FIG. 4 is an end view of the hydraulic unit of the apparatus shown in FIG. 1 with the front wall and one sidewall removed.
Figure 7:
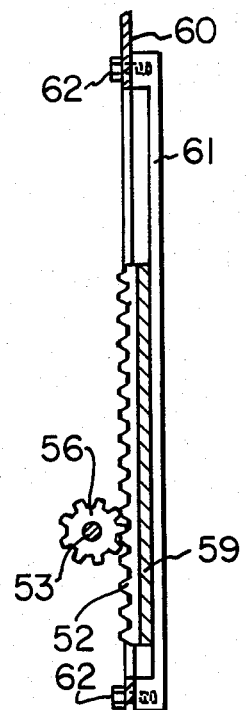
FIG. 7 is a section on line VII—VII of FIG. 6.

With specific reference to FIG. 4 of the drawings, a reservoir 22 having a drain pipe 23 at the bottom with a valve 24 is located within housing 11. The reservoir is supported on the upper surface of bottom wall 15 of the housing by a plurality of resilient pads. A plurality of vertically oriented 100 milliliter capacity cylinders 25 are located within housing 11 and extend upwardly from the upper surface of bottom wall 15. Each cylinder 25 is supported on bottom wall 15 by a bracket 26 attached to the bottom wall and a pivot pin 27 extending through the lower end of the cylinder and the upper end of the corresponding bracket. The upper end of each cylinder is closed except for a central opening for passage of a piston rod 28 having a plunger or piston 29 attached to its lower end and located within the cylinder. The upper end of each piston rod 28 is threadedly attached to a clevis 30, and the upper split end 31 of each clevis 30 carries a pin 32 which extends through an opening in an operating arm 33. The rear end of each operating arm 33 is pivotally attached to a pivot pin 35 supported by a member 34 which is attached to the inner surface of the back wall 16 of housing 11. The elongated pivot pin 35 extends throughout the length of member 34 and is held in place in member 34 by set screws. Pivotal movement of the operating arms 33 permits each piston rod 28 and the plunger or piston 29 attached thereto to be raised and lowered relative to a cylinder 25. As a piston rod is raised or lowered, the corresponding cylinder will rotate about its pivot pin 27.

As can be seen in FIGS. 1 and 3 of the drawings, each operating arm 33 extends outwardly through a vertical slot 20 and 21 in the front wall 17 of housing 11. The outer ends of three operating arms 33 are connected by a cross member 37 which is screwed to the operating arms. Cross member 37 carries a socket 38. The socket has a standard longitudinal bayonet slot extending along its length with a radial slot at its end, and the end of an elongated cylindrical handle 36 has an axially extending pin which seats in the radial slot of the bayonet slot when the end of the handle is inserted in the socket to connect socket 38 and the end of the handle. Thus, it will be seen that when a handle 36 is raised or lowered by the operator of the hydraulic unit 10, each set of three individual operating arms 33 will pivot about pin 35 to simultaneously raise or lower piston rods 28 and plungers 29 in three cylinders 25. A second set of three operating arms works in the same way as the first set of operating arms and is raised and lowered by a similar handle 36 attached to a socket 38. A grip 39 is fixed to the free end of each handle 36.

A substantially horizontal cylindrical manifold 40 extends away from the lower end of reservoir 22 toward the sidewall 14 of housing 11 and is in flow communication with the reservoir. The manifold is supported on the inner surface of the back wall 16 of housing 11 by a plurality of U-shaped brackets 41 which are fastened to the rear wall by machine screws 42.

The lower end of each cylinder 25 is connected to manifold 40 by a T connector 43 with one leg in flow communication with each cylinder 25 and a flexible hose 44 extending between a nipple (not shown) on the manifold and another leg of the T connector. A one-way check valve 45 is located at each T connector 43 so as to be between each hose 44 and a cylinder 25 to permit flow of liquid only from manifold 40 into the lower end of a cylinder 25. The third leg of each T connector is connected to a one-way check valve 49 which is connected to a serrated coupler 46. Each coupler 46 has a hose 47 connected thereto and an injector 48 is attached to the end of each hose 47. Check valves 49 prevent liquid from flowing from the hoses back into the cylinders when the pistons are raised to draw liquid into the cylinders from reservoir 22.

As shown in FIG. 3 of the drawings, the slots 21 in the front wall 17 of housing 11 receive bolts (not shown) attached to locking wing nuts 50. The locking wing nuts support an adjustable stop plate 51 which is vertically movable on front wall 17 along slots 21 to stop the downward movement of operating arms 33 and thereby control the amount of liquid which discharged from cylinders 25 through check valves 49 into hoses 47. The front wall of the housing is calibrated from 0 to 100 milliliters at each edge of stop plate 51 so that the operator of the hydraulic injection unit can set the upper edge of the stop plate to accurately control the amount of liquid discharged from the cylinders upon downward movement of handles 36 of one or both sets of operating arms 33.

Figure 6:
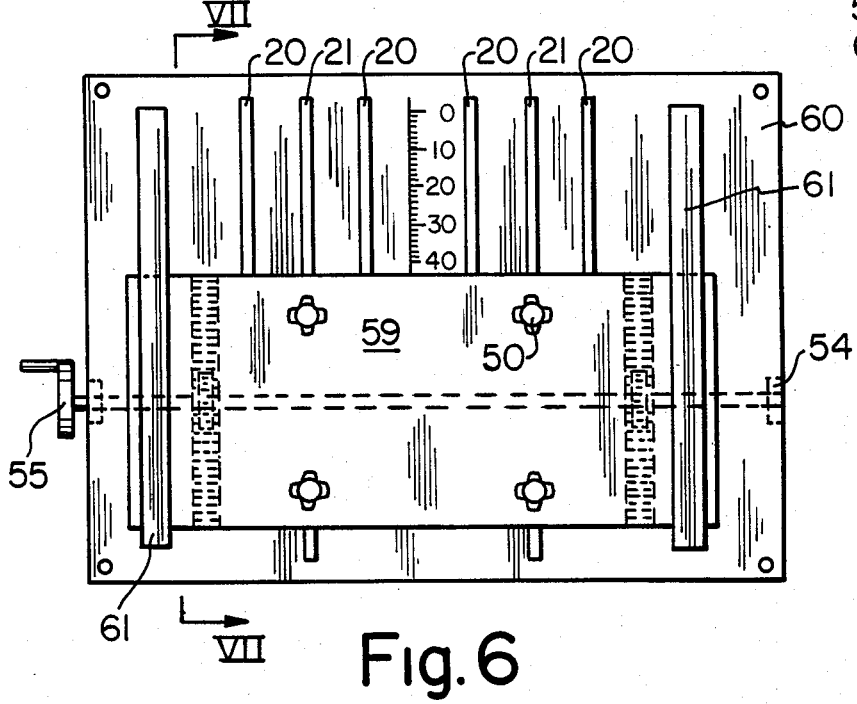
FIG. 6 is a front wall of the hydraulic unit in accordance with a second embodiment of the invention.
Figure 5:
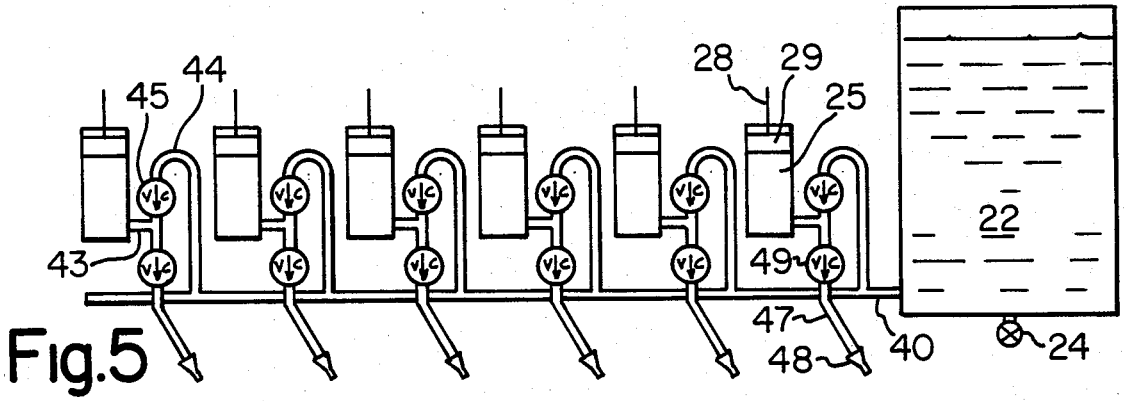
FIG. 5 is a flow diagram of the hydraulic system of the hydraulic unit.

In the embodiment shown in FIG. 6 of the drawings, a stop plate 59 is held in position on the front wall 60 of housing 11 by bolts (not shown) attached to locking wing nuts 50. However, in this embodiment, a pair of racks 52 are fixed to the rear surface of stop plate 59. An elongated shaft 53 is mounted in pillow blocks 54 carried on the rear surface of front wall 60 of housing 11, and a hand crank 55 is fixed to one end of shaft 53. The shaft carries a pair of pinion gears 56 which are fixed on the shaft and which extend through openings (not shown) in front wall 60 to mesh with the racks 52 on the rear surface of stop plate 59 so that rotation of hand crank 55 rotates shaft 53 and pinion gears 56 which drive racks 52 on the rear surface of stop plate 59 to raise or lower the stop plate depending upon the direction of rotation of the hand crank. As seen in FIG. 6 of the drawings, a calibration scale in milliliters is located on front wall 60 between the inner pair of slots 20 so that the amount of liquid to be forced out of cylinders 25 can be controlled by the location of the upper edge of stop plate 59. A pair of spaced hold down members 61 overlie opposite ends of stop plate 59 in FIG. 6 of the drawings to hold the stop plate in engagement with the face of front wall 60 and insure engagement of racks 52 with pinion gears 56. Each hold down member is attached to front wall 60 by machine screws 62.

In operation, either three or six hoses and injectors will be used depending upon the size of the trunk of the tree to be treated. Holes are drilled in the trunk, and the injector 48 at the end of each hose 47 is forced into the holes in the trunk of the tree. The stop plate is adjusted vertically to determine how many milliliters of liquid will be injected into the tree. When the stop plate is properly positioned, it is held in place by tightening the locking wing nuts 50. The individual cylinders 25 are already filled with liquid from reservoir 22, and the handles 36 are in the uppermost position as shown in FIGS. 2 and 3 of the drawings. The handles are moved downwardly until the lower edges of opening arms 33 contact the upper edge of the stop plate. During downward movement of the operating arms, liquid is forced out of each cylinder 25 through a T connector 43, a check valve 49, a hose 47 and an injector 48 into the trunk of the tree being treated.

After a tree has been treated, cylinders 25 may be refilled from reservoir 22 by raising handles 36 to the uppermost position to draw liquid from the bottom of the reservoir through manifold 40, plastic hoses 44, check valves 45 and T connectors 43 into each cylinder. The handles 36 are now in the uppermost position, and the hydraulic injection unit is ready for treating the next tree upon proper adjustment of the stop plate.

While preferred embodiments of the invention have been described herein, it is to be understood that it may be embodied within the scope of the appended claims.

I claim:

1. A portable unitary hydraulic injection apparatus having a housing, a liquid reservoir located within said housing, a plurality of independent substantially closed cylinders mounted within said housing, separate inlet means for each of said cylinders located within said housing, means located within said housing providing a liquid connection between said reservoir and said inlet means for each of said cylinders, a reciprocable piston located within each of said cylinders, of reciprocable piston rod for each of said cylinders having a lower end attached to a piston located within a cylinder and extending out of the upper end of a cylinder with an upper end located above each of said cylinders, means attached to the upper end of each of said piston rods for raising and lowering each of said piston rods and said attached pistons relative to each of said cylinders, independent outlet means located within said housing for each of said cylinders to permit liquid to flow out of each said cylinders, an outlet hose connected with each of said independent outlet means and extending out of said housing for receiving liquid discharged from said independent outlet means of each of said cylinders and an injector at the end of each of said outlet hoses, whereby upward movement of said pistons draws liquid from said reservoir into each of said cylinders and downward movement of said pistons forces liquid out of said outlet means of each of said cylinders and through said outlet hoses and said injectors.

2. Apparatus as set forth in claim 1 including a T connector in fluid communication with each of said cylinders, said inlet means for each of said cylinders is a separate portion of said T connector and said outlet means for each of said cylinders is a portion of said T connector.

3. Apparatus as set forth in claim 2 including a check valve located between said reservoir and the inlet means portion of each of said T connectors.

4. Apparatus as set forth in claim 1 wherein said means providing a liquid connection between said reservoir and said inlet means for each of said cylinders is an elongated manifold connected to said reservoir, an inlet hose extending from said elongated manifold to said inlet means for each of said cylinders and said inlet means for each of said cylinders includes a check valve located between each of said inlet hoses and each of said cylinders.

5. Apparatus as set forth in claim 1 wherein said inlet means for each of said cylinders includes a check valve.

6. Apparatus as set forth in claim 1 wherein said outlet means for each of said cylinders includes a check valve.

7. Apparatus as set forth in claim 1 including means mounting each of said cylinders within said housing for pivotal movement of each of said cylinders relative to said housing.

8. Apparatus as set forth in claim 1 wherein said means attached to the upper end of each of said piston rods for raising and lowering each of said piston rods is an operating arm, each of said operating arms being pivotally connected to said housing.

9. Apparatus as set forth in claim 8 including a cross member connecting a plurality of said operating arms for simultaneous movement of said plurality of operating arms and a handle connected to said cross member to simultaneously move said plurality of operating arms.

10. Apparatus as set forth in claim 9 wherein said plurality of operating arms includes at least two sets with three operating arms in each set and the three operating arms in each set are connected by said cross member, whereby each set of said operating arms is moved by a handle for simultaneous movement of said three operating arms in each of said sets.

11. Apparatus as set forth in claim 8 including a front wall on said housing, a plurality of spaced parallel substantially vertical slots formed in said front wall, each of said operating arms extending from said pivotal connection with said housing through one of said slots, whereby said operating arms move in said slot and adjustable means on said front wall for stopping the downward movement of said operating arms in said slots.

12. Apparatus as set forth in claim 11 wherein said means for stopping the downward movement of said operating arms in said slots is a stop plate attached to said front wall of said housing.

13. Apparatus as set forth in claim 12 including means for adjustably attaching said stop plate in a desired position on said front wall of said housing.

14. Apparatus as set forth in claim 13 wherein said means for adjustably attaching said stop plate on said front wall of said housing is a plurality of locking wing nuts attached to threaded bolts extending through said stop plate and said slots in said front wall of said housing.

15. Apparatus as set forth in claim 11 wherein said means for stopping the downward movement of said operating arms is a stop plate slidably attached to sid front wall of said housing and mechanical means for vertically adjusting the position of said stop plate on said front wall of said housing.

16. Apparatus as set forth in claim 15 wherein said mechanical means for vertically adjusting said stop plate is rack means on said stop plate and pinion gears in driving engagement with said rack means, said pinion gears being fixed on an elongated substantially horizontal shaft carried on said front wall of said housing and a crank fixed to one end of said shaft for rotating said shaft and said pinion gears to drive said rack means.

17. Apparatus as set forth in claim 16 including a hold down member overlying each end of said stop plate, each of said hold down members attached to the face of said front wall of said housing, whereby said hold down members maintain said rack means on said stop plate in contact with said pinion gears.

18. Apparatus as set forth in claim 1 wherein said portable unitary hydraulic injection apparatus is mounted on a frame, an axle mounted on said frame and wheels mounted on said axle, whereby said hydraulic injection unit can be moved by rolling said unit on said wheels.

19. Apparatus as set forth in claim 18 including a container attached to said frame.

* * * * *

UNITED STATES PATENT AND TRADEMARK OFFICE
CERTIFICATE OF CORRECTION

PATENT NO. : 4,505,067

DATED : March 19, 1985

INVENTOR(S) : John L. Gillespie

It is certified that error appears in the above-identified patent and that said Letters Patent is hereby corrected as shown below:

Column 1 Line 12 "transportion" should read --transportation--.

Column 2 Line 49 After "tree" insert --to tree--.

Column 4 Line 5 After "which" insert --is--.

Column 4 Line 52 "opening" should read --operating--.

Claim 2 - Column 5 Line 31 After "a" insert --separate--.

Claim 2 - Column 5 Line 34 Delete --separate--.

Claim 11 - Column 6 Line 18 "slot" should read --slots--.

Claim 15 - Column 6 Line 37 "sid" should read --said--.

Signed and Sealed this

Twenty-seventh Day of August 1985

[SEAL]

*Attest:*

DONALD J. QUIGG

*Attesting Officer*  *Acting Commissioner of Patents and Trademarks*